United States Patent Office 3,258,575
Patented June 28, 1966

3,258,575
METHOD OF WELDING
Phillip D. Santilhano, Renfrew, Scotland, assignor to Babcock & Wilcox, Limited, London, England, a corporation of Great Britain
No Drawing. Filed Nov. 1, 1963, Ser. No. 320,842
Claims priority, application Great Britain, Nov. 2, 1962, 41,641/62
13 Claims. (Cl. 219—73)

This invention relates to a method of welding by the electro-slag process.

The process is one in which opposed upright metal workpiece surfaces are welded together by forming a pool of molten metal covered by a layer of molten slag in a welding zone or gap between the surfaces, the pool being continuously supplied with metal by a welding wire or welding wires carrying a current and fed into the slag layer, the $I^2R$ effect producing heating sufficient to reduce the welding wire metal to a molten state. Shoes, normally water-cooled, are provided to close the ends of the gap and are moved upwardly as the welding proceeds. The gap hitherto used is between 1¼ and 1⅜ inches in width with a welding current of 600 amps. in the or each welding wire, a voltage of between 46 and 50 volts and a welding speed of between three and four feet per hour.

The weld produced by such a process is of coarse grain structure and requires normalizing at temperatures between 950° C. and 1050° C. to reduce the grain size and develop properties requisite for acceptance of the welded joint under the requirements of the British Standard Specification 1500 boiler code. Further, normalizing of welds, particularly large drum welds, is a difficult and costly procedure.

The present invention is directed to a method of welding in which weld metal is deposited by the electro-slag process and the deposited weld metal is cooled at a rate such that the time the weld at any location exceeds a temperature of 700° C. is so limited that a fine grain structure weld is produced, thereby eliminating the need for normalizing the weld.

I have determined that when a grain growth inhibiting substance is not introduced into the weld, the formation of a coarse grain weld structure is avoided if the time any part of the weld exceeds 700° C. is limited to no greater than three minutes. This time limit is critical for if the weld temperature exceeds 700° C. for a time greater than three minutes, then the grain size becomes too coarse to be accepted as fine within the requirements of the boiler code, with the consequence that normalizing of the weld is required to reduce the grain size to that necessary to meet the requirements of the boiler code. Desirably when a grain growth inhibiting substance is not introduced into the weld, no part of the weld should exceed a temperature of 700° C. for a time greater than two minutes.

I have also found that this three minute time limit can be extended to five minutes, but only if a grain growth inhibiting substance is introduced into the weld. If the temperature of the weld exceeds 700° C. for a time greater than five minutes with the use of such substance, even the presence of the grain growth inhibiting substance does not prevent the grain size from becoming too coarse in terms of the boiler code.

According to one mode of carrying out the invention, given by way of example, two mild steel components to be welded together are arranged to provide an upright, parallel-sided, gap or welding zone between the edges of the components. A consumable welding wire, or consumable welding wires, depending on the depth of the gap, carrying current, is, or are, arranged to be fed into a layer of slag, covering a pool of molten metal. The $I^2R$ effect in the wire produces a heating effect and the welding wire becomes molten. Water-cooled shoes close the ends of the gap and are moved upwardly as the welding proceeds. Such an arrangement is similar to that used in connection with the electro-slag welding process practised heretofore.

However, in the said mode of carrying out the invention, conditions are altered from those utilized heretofore whereby the time that any part of the weld exceeds 700° C. is limited as described above and a weld is obtained having a grain structure of a fineness acceptable under the said boiler code.

The rate of cooling of the weld is influenced to a large extent by the rate of deposition of weld metal which governs the speed of progression of the weld up the gap. Since the rate of deposition of wild metal is dependent on the rate of supply of heat to melt the welding wire or wires, that is, the power supplied to the weld, the power input to the weld may be made sufficiently high to attain a welding speed fast enough to ensure the requisite cooling of the weld by dissipation of the heat to the metal being welded.

Thus, in the said mode, a high conductivity flux is used to provide the slag; and the power input to the weld is sufficiently high to give a welding speed of at least eight feet per hour so that there is less heat input per unit length of the parent metal in unit time compared with conventional electro-slag welding. This enables the necessary dissipation of heat to the parent metal to be achieved as well as tending to lower the total heat input per unit length.

Another factor influencing the rate of cooling of the weld is the depth of penetration of the weld into the surfaces flanking the gap, which is governed to a large extent by the voltage of the power input to the weld. An acceptable depth of penetration is achieved with the voltage of the power input having a value of between 20 volts and 36 volts inclusive, with the best results normally being obtained utilizing a voltage of 34 to 36 volts. If the voltage falls below 20 volts, it is very likely that there will be insufficient penetration of the weld into the parent metal; while if the voltage exceeds 40 volts, it is very likely that the penetration will be too great.

Using a voltage lower than the voltage normally used for electro-slag welding and a power input substantially greater than that normally used for electro-slag welding necessitates a current density in the or each welding wire substantially greater than that normally used for electro-slag welding. At the same time it is desirable to utilize welding wire of a diameter slightly less than that normally used for electro-slag welding.

Thus in the said mode, the diameter of the welding wire between 3/64 of an inch and 3/32 of an inch and currents between approximately 500 and 900 amps. are used, but no less than 400 amps. A welding current above 400 amps. is necessary to obtain a sufficient power input into the weld, while currents in excess of 900 amps. are considered to be impractical.

Another factor influencing the rate of cooling of the weld is the gap width between the surfaces. Acceptable rates of cooling are obtained if, with the said mode the weld is deposited in a gap of a width no greater than ⅞ of an inch, best results being obtained with a gap width ¾ of an inch or slightly less.

In instances in which the depth of the gap exceeds 1¾ inches it is necessary to supply welding wires at intervals across the depth of the gap, in order to supply sufficient weld metal and power to the pool of molten metal to ensure a sufficiently rapid welding speed.

With such a gap of a width no greater than ⅞ of an inch and a depth greater than 1¾ inches, suitable welding wire is supplied to the weld at intervals over the depths of the gap such that each welding wire supplies approximately 1⅛ square inches of the gap. In instances in which it is only necessary to supply one welding wire to the gap the wire is situated at or near the center of the gap, while in instances in which a plurality of welding wires are utilized they are supplied symmetrically to the gap, along the depth thereof.

In order to obtain an acceptable value for Charpy impact tests made on the weld after stress relieving at 650° C., it is necessary to reduce the carbon content of the welding wire in comparison with that normally used in electro-slag welding to obtain a suitable carbon content in the weld.

Thus in accordance with the invention method, the welding wire supplied to the weld should have a carbon content less than or equal to 0.12%. If the carbon content of the weld wire is greater than .12%, then the carbon content of the weld becomes unsatisfactory and the weld gives unsatisfactory results when subjected to Charpy impact tests.

While either an alternating current or a direct current power input to the weld may be used, preferably a direct current input is utilized since a higher speed of welding is possible for a given voltage and current input due to the need to apply a power factor correction to figures involving an alternating current power input. Furthermore, it is possible that a direct current power input has a beneficial effect on the weld due to a stirring effect produced in the pool of molten metal by the direct current.

By way of example, a weld having a grain structure of a fineness such as to be acceptable under the said boiler code was produced in a gap having a width of ⅝ of an inch and a depth of 1½ inches using a single welding wire of 5/64 of an inch diameter supplied with a total power of 20.4 kilowatts at a voltage of 34 volts and a direct current of 600 amps. giving a welding speed of 8 feet per hour. The welding wire had an analysis as follows:

|  | Percent |
| --- | --- |
| Carbon | 0.09 |
| Silicon | 0.19 |
| Manganese | 1.92 |
| Sulphur | 0.021 |
| Phosphorus | 0.021 |
| Nickel | 0.15 |
| Chromium | 0.15 |
| Molybdenum | 0.02 |
| Copper | 0.32 |
| Tin | 0.02 |

The welding flux used had a high conductivity and had an analysis as follows:

|  | Percent |
| --- | --- |
| $SiO_2$ | 46.21 |
| MnO | 34.5 |
| $CaF_2$ | 7.63 |
| $Al_2O_3$ | 5.06 |
| MgO | 4.9 |
| $Fe_2O_3$ | 1.54 |
| $K_2O$ | 0.06 |
| $Na_2O$ | 0.05 |
| $TiO_2$ | 0.05 |

After stress relieving the weld at 650° C., the following mechanical properties were found:

| | |
| --- | --- |
| Yield point, tons per square inch | 21.3 |
| Maximum stress, tons per square inch | 30.7 |
| Elongation, percent | 33.0 |
| Reduction in area, percent | 66.3 |

Charpy impact tests at the center of the weld gave the following figures:

| Temp.: | Charpy impact values (ft. lbs.) |
| --- | --- |
| −60° C. | 8 |
| −40° C. | 23 |
| −20° C. | 25 |
| 0° C. | 29 |
| +20° C. | 53 |
| +40° C. | 63 |
| +60° C. | 80 |

In other tests, similar figures were obtained with a gap of ¾ of an inch and 36 volts and with a gap of ½ of an inch and 30 volts, the welding wire diameter, the power input and the welding speed being the same as in the above test.

While the foregoing mode sets out the conditions desirable, under normal circumstances, in order to produce a fine grain structure, under certain circumstances some variation in the conditions may be desirable. Thus when a flux of higher conductivity and lower resistivity than that detailed is used, a voltage as low as 20 volts will give sufficient penetration. Furthermore, a wire having a diameter as low as 1/32 of an inch may be used, in which case the required power input may be achieved with a current as low as 400 amps. In other circumstances, such as when the gap is of a depth greater than 1¾ inches and more than one wire is supplied to the gap, it may be necessary to utilize a voltage of up to 38 or even 40 volts in order to obtain a desired degree of penetration.

While the foregoing modes are directed towards insuring that the speed of progression of the weld up the gap is sufficient to produce the required rate of cooling of the weld, it will be appreciated also that it is possible to increase the rate of cooling of the weld in order to limit the time the weld exceeds 700° C. and to obtain the required fine grain size by increasing the rate of removal of heat from the weld through the shoes closing the ends of the gap.

Thus, in another mode of carrying out the invention, the weld is deposited in a gap the ends of which, during deposition of the weld, are closed by shoes cooled with brine at a temperature less than zero on the centigrade scale.

While the foregoing modes are directed to insuring that no part of the weld exceeds a temperature of 700° C. for a time no greater than 3 minutes, or, more desirably, for a time no greater than 2 minutes, it is possible to achieve a fine grain weld structure in instances in which the temperature of the weld exceeds 700° C. for a time of up to 5 minutes if grain growth inhibiting substances are introduced into the weld. Thus, inclusion of nickel or titanium or alloys thereof in the welding wire will tend to limit the grain growth in the weld.

While in accordance with the provisions of the statutes, I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

What is claimed is:

1. A method of weld uniting by the electro-slag process opposing steel workpiece surfaces arranged to form a welding zone, said method comprising depositing steel weld metal in said welding zone, and cooling the deposited weld metal at a rate such that the time the weld at any location exceeds a temperature of 700° C. is so limited that a fine grain structure weld is produced.

2. A method of welding as claimed in claim 1, wherein the deposited metal is cooled at such a rate that no part of the weld exceeds a temperature of 700° C. for a time greater than three minutes.

3. A method of welding as claimed in claim 1, wherein the deposited metal is cooled at such a rate that no part of the weld exceeds a temperature of 700° C. for a time greater than two minutes.

4. A method of welding as claimed in claim 1, wherein a grain growth inhibiting substance is introduced into the weld and the deposited metal is cooled at such a rate that the temperature of the weld does not exceed 700° C. for a time greater than five minutes.

5. A method of welding as claimed in claim 1, wherein the power input to the weld is sufficiently high to give a welding speed of at least eight feed per hour whereby heat dissipation and a low total heat input per unit length of weld is achieved by such speed..

6. A method of welding as claimed in claim 5, wherein the weld is deposited in a gap of a width no greater than 7/8 of an inch and of a depth no greater than 1 3/4 inches, a single wire is supplied to the weld, the voltage of the power input is between 20 and 36 volts inclusive and a high conductivity flux is utilized to provide the slag.

7. A method of welding as claimed in claim 5, wherein the depth of the gap is greater than 1 3/4 inches and a plurality of welding wires is supplied to the weld at intervals over the depth of the gap such that each welding wire supplies approximately 1 1/8 square inches of the gap, the voltage of the power input is between 28 and 40 volts inclusive and a high conductivity flux is utilized to provide the slag.

8. A method of welding as claimed in claim 5, wherein the diameter of the welding wire is between 3/64 of an inch and 3/32 of an inch and the current fed to the welding wire supplied to the weld has a value of between 500 and 900 amps.

9. A method of welding as claimed in claim 7, wherein the diameter of each welding wire is between 3/64 of an inch and 3/32 of an inch and the current fed to each welding wire supplied to the weld has a value of between 500 and 900 amps.

10. A method of welding as claimed in claim 5, wherein the diameter of the welding wire is between 1/32 of an inch and 3/64 of an inch and the current fed to the welding wire supplied to the weld has a value of between 400 and 500 amps.

11. A method of welding as claimed in claim 7, wherein the diameter of each welding wire is between 1/32 of an inch and 3/64 of an inch and the current fed to each welding wire supplied to the weld has a value of between 400 and 500 amps.

12. A method of welding as claimed in claim 5, wherein the weld metal is deposited in a gap of a width no greater than 3/4 of an inch.

13. A method of welding as claimed in claim 1, wherein welding wire supplied to the weld has a carbon content no greater than 0.12%.

References Cited by the Examiner

UNITED STATES PATENTS

| | | | |
|---|---|---|---|
| 2,043,960 | 6/1936 | Jones et al. | 219—73 |
| 2,227,193 | 12/1940 | Maxwell | 219—73 |
| 2,241,572 | 5/1941 | Armstrong | 219—73 |
| 2,395,723 | 2/1942 | Chimielewski | 219—137 |
| 2,444,834 | 7/1948 | Landis et al. | 219—73 |
| 2,997,571 | 8/1961 | Smout | 219—126 |
| 3,024,352 | 3/1962 | Danhier | 219—126 |
| 3,102,025 | 8/1963 | Wilcox | 219—73 |
| 3,137,782 | 6/1964 | Rieppel et al. | 219—61 |

RICHARD M. WOOD, *Primary Examiner.*